(12) United States Patent
Wloczysiak et al.

(10) Patent No.: US 10,625,539 B2
(45) Date of Patent: Apr. 21, 2020

(54) DECORATIVE LAMINATE

(71) Applicant: Wilsonart LLC, Austin, TX (US)

(72) Inventors: Philippe Wloczysiak, Baneuil (FR); Anne Claire Ferrandez, Baneuil (FR)

(73) Assignee: Wilsonart LLC, Austin, TX (US)

( * ) Notice: Subject to any disclaimer, the term of this patent is extended or adjusted under 35 U.S.C. 154(b) by 23 days.

(21) Appl. No.: 15/548,554

(22) PCT Filed: Feb. 3, 2016

(86) PCT No.: PCT/FR2016/050222
§ 371 (c)(1),
(2) Date: Aug. 3, 2017

(87) PCT Pub. No.: WO2016/124855
PCT Pub. Date: Aug. 11, 2016

(65) Prior Publication Data
US 2018/0015776 A1    Jan. 18, 2018

(30) Foreign Application Priority Data

Feb. 4, 2015  (FR) ...................................... 15 50861

(51) Int. Cl.

| | |
|---|---|
| *B44C 5/04* | (2006.01) |
| *B32B 29/00* | (2006.01) |
| *B32B 37/10* | (2006.01) |
| *D21H 19/24* | (2006.01) |
| *D21H 19/66* | (2006.01) |

(52) U.S. Cl.
CPC .......... *B44C 5/0469* (2013.01); *B32B 29/005* (2013.01); *B32B 37/10* (2013.01); *B44C 5/04* (2013.01); *D21H 19/24* (2013.01); *D21H 19/66* (2013.01); *B32B 2451/00* (2013.01)

(58) Field of Classification Search
CPC ....... B44C 5/0469; B44C 5/04; B32B 29/005; D21H 19/66; D21H 19/68; D21H 19/70
See application file for complete search history.

(56) References Cited

U.S. PATENT DOCUMENTS 2,857,302 A * 10/1958 Burton .................... B32B 27/00
156/183
3,220,916 A * 11/1965 Petropoulos ............ B32B 27/00
428/339

(Continued)

FOREIGN PATENT DOCUMENTS

| EP | 0122396 A2 | 10/1984 |
|---|---|---|
| WO | WO 00/41883 A1 | 7/2000 |

(Continued)

OTHER PUBLICATIONS

Otto Wittmann, "Wood-Based Materials," in Ullmann's Encyclopedia of Industrial Chemistry, published online 2014, 39 pages.*

*Primary Examiner* — Nicholas E Hill
(74) *Attorney, Agent, or Firm* — Welsh Flaxman & Gitler LLC

(57) ABSTRACT

The invention relates to a decorative laminate comprising a core impregnated with a phenolic resin, coated on at least one of the faces thereof with a sheet impregnated with a mixture comprising an alkylated melamine resin and an acrylic polyol resin. The invention also relates to a process for preparing such a laminate and the use thereof as coating material.

13 Claims, 1 Drawing Sheet

(56) References Cited

U.S. PATENT DOCUMENTS

| | | | |
|---|---|---|---|
| 4,088,807 A | | 5/1978 | Sakata et al. |
| 4,456,747 A | | 6/1984 | Didomenico |
| 4,528,344 A | | 7/1985 | Chang |
| 5,532,027 A | * | 7/1996 | Nordstrom ............. B05D 3/065 427/387 |
| 2003/0129361 A1 | * | 7/2003 | Plug ........................ B27N 5/00 428/172 |

FOREIGN PATENT DOCUMENTS

| | | |
|---|---|---|
| WO | WO 02/04208 A1 | 1/2002 |
| WO | WO 2007/028792 A1 | 3/2007 |

* cited by examiner

DECORATIVE LAMINATE

TECHNICAL FIELD OF THE INVENTION

The present invention relates to the field of decorative laminates. The invention more particularly relates to a laminate comprising a core coated on at least one of the faces thereof with a decorative sheet impregnated with a mixture of melamine type resin and acrylic polyol type resin.

PRIOR ART

Decorative laminates are used for numerous applications in the building, fitting and furnishings sector.

These laminates are customarily in the form of a plate which generally comprises a portion referred to as the core, formed of an assembly of superposed layers or sheets made of cellulose fiber material (most commonly kraft paper) impregnated with thermosetting resins and attached together by a high-pressure process. This high-pressure process is defined as the simultaneous application of heat and of a specific high pressure, in order to enable the creep, then the polycondensation, of the thermosetting resins, and to obtain a non-porous homogeneous material with an increased density ($\geq 1.35$ g/cm$^3$) having the required surface finish. The layer(s) constituting the decorative layer have decorative patterns or colors and are impregnated with melamine resin and/or covered with a surface covering impregnated with melamine resin.

However, the melamine surface of the decorative laminates is liable to be degraded by light and exposure to moisture and to water. The degradation causes fading of the colors or even cracking of the melamine surface, which makes the decorative laminates non-resistant, or only resistant in the short term, for outdoor applications such as facade cladding, outdoor furniture, etc. In order to improve these properties of resistance to aging due to UV rays and moisture, various technologies are used. One of these technologies consists in applying an acrylic film of PMMA (polymethyl methacrylate) or PMMA/PVDF (polyvinylidene fluoride) type to the melamine surface. This film is stacked then laminated with the components of the decorative laminated panel in order to form a protective layer on the surface of the panel. This film provides enhanced properties in terms of light-induced discoloration and aging. However, these films are susceptible to scratching and abrasion and become degraded under the effect of the solvents liable to be used for cleaning the panels. Moreover, these films are expensive.

Another technology is the application of an acrylic coating to the decorative sheet or to the finished panels. The coating is polymerized by UV radiation or by electron beam. This coating makes it possible to improve the resistance to aging and to discoloration under the effect of light, and provides good surface resistance properties (scratching, abrasion, resistance to solvents). However, this technology is complex, with the requirement to work under a controlled atmosphere, and restrictive in terms of health and safety. Moreover, this technology is limited in terms of patterns because it only makes it possible to work with plain decorations in the case in which it is applied to the finished product, it is limited in terms of surface structure, and it is expensive.

Another technology, described in US Patent Application Publication No. 2003/0003257, consists in applying a protective acrylic-urethane layer with a radical initiator in an organic medium to the surface of a laminate via a mold-release sheet. This technology poses problems for health and safety when it produced, through the use of systems in an organic medium.

Another technology, described in EP Patent Application Publication No. 122396, consists in 1) impregnating the core with a thermosetting mixture of a phenol/formaldehyde resin, of a crosslinked acrylic resin and optionally of a melamine/formaldehyde resin, and 2) impregnating the decorative sheet firstly with a mixture of a melamine/formaldehyde resin and of a crosslinked acrylic resin then secondly with a mixture of melamine/formaldehyde resin and of abrasive particles.

Another technology, described in PCT Publication No. WO 97/49746, consists in applying a layer based on polyurethane acrylate and on an isocyanate hardener. The presence of isocyanate in the coating is a limiting factor due to its cost and its toxicity.

Finally, another technology is the formation of a film of varnish type composed of aminoplast and/or isocyanate crosslinking agents, which forms a three-dimensional polymer network with the acrylic polyol binder. The by-product of the reaction is a primary alcohol, which is eliminated by drying (heat, IR, etc.). The modification of the melamine resin by alcohol functions and more particularly by polyols has been used, in particular in the field of varnishes and paints, to confer resistance to ultraviolet radiation upon the melamine based materials. These systems have the advantage of being competitive in terms of cost, but cannot be applied simply to the high-pressure process of decorative laminates, in particular because the primary alcohol by-product cannot be eliminated in high-pressure processes.

A first objective of the invention aims to provide resistance to the aging and discoloration of the surface of the decorative laminates linked to exposure to UV radiation and to hygrometric conditions when used outdoors.

Another objective of the invention is to retain good resistance to damage (scratching, cleaning) of the decorative laminates.

Another objective of the invention is to produce decorative laminates having a wide choice of decorations and surface structures.

Another objective of the invention is to prepare decorative laminates which are resistant to outdoor conditions while managing the manufacturing costs and while complying with the best conditions for health and safety.

BRIEF DESCRIPTION OF THE INVENTION

Therefore, according to a first aspect, the present invention relates to a decorative laminate comprising a core associated on at least one of the faces thereof with a sheet impregnated with a mixture of alkylated melamine resin and of acrylic polyol resin. In one embodiment of the invention, the sheet impregnated with a mixture of alkylated melamine resin and of acrylic polyol resin is a decorative sheet. In another embodiment, this impregnated sheet is a protective sheet.

According to a second aspect, the invention also relates to a process for preparing such a decorative laminate. Advantageously, the lamination is performed by thermocompression, most commonly in a press.

According to a third aspect, the invention also relates to the use of such a decorative laminate as rigid material or material laminated to a support based on wood, plaster or metal, for the coating of building facades or for the coating of walls and partitions, of sanitary cabin walls, of work surfaces, or of furniture for indoor or outdoor use.

DETAILED DESCRIPTION OF THE INVENTION

Figure 1A:
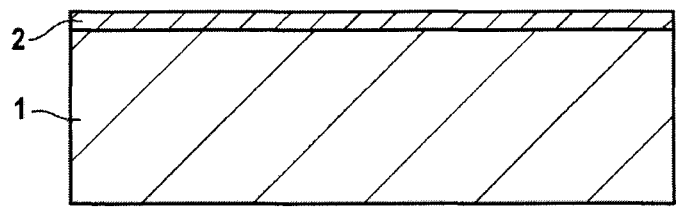
FIG. 1A represents a laminate 10 according to the invention, comprising a core 1 coated on one of the faces thereof with a sheet 2 impregnated with a mixture of alkylated melamine resin and of acrylic polyol resin.

According to a first aspect, the subject of the present invention is a decorative laminate (10,100,20,30) comprising a core 1 associated on at least one of the faces thereof with a sheet (2, 4) impregnated with a mixture of alkylated melamine resin and of acrylic polyol resin.

Conventionally, the core is formed of an assembly of superposed layers or sheets made of cellulose fiber material, most commonly kraft paper, the layers or sheets constituting the core being impregnated with phenolic resin, especially of resol type (phenol-formaldehyde). In accordance with the invention, the core is not impregnated by a resin other than the phenolic resin. The core may be of standard, post formable or non-flammable quality. It is prepared by steps of bringing Kraft paper into contact with the phenolic resin, followed by a step of drying (typically at a temperature from 80 to 150° C.) with the purpose of, on the one hand, eliminating some of the volatile materials, and, on the other hand, continuing the polymerization step.

The core is associated on at least one of the faces thereof with a sheet (2, 4) impregnated with a mixture of alkylated melamine resin and acrylic polyol resin. In accordance with the invention, the mixture with which the sheet (2, 4) is impregnated does not comprise resins other than the alkylated melamine resin and the acrylic polyol resin mentioned above. Alkylated melamine resin is intended to mean a compound of formula:

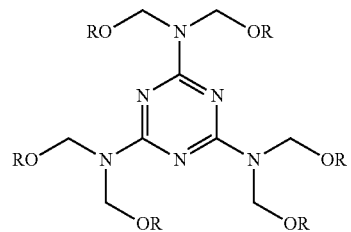

in which R represents a methyl or a butyl.

The melamine is crosslinked by means of a polyol acrylate having at least two hydroxyl functions according to the scheme below, in which, by way of illustration, the melamine is methylated:

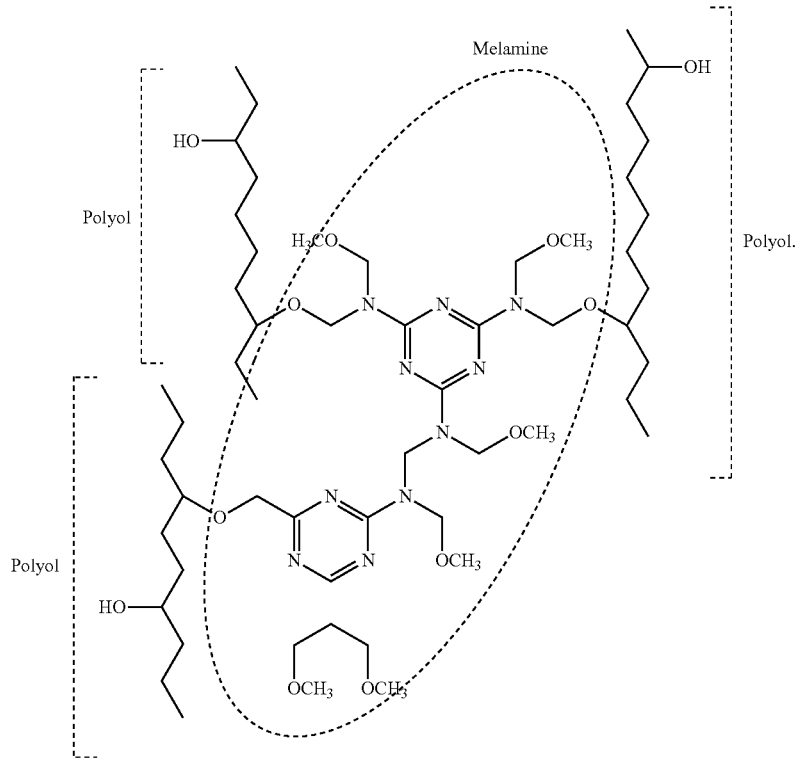

Advantageously, the alkylated melamine resin and the acrylic polyol resin are mixed in a weight ratio ranging from about 1 to about 5, preferably from about 1 to about 3.

The alkylated melamine resin preferably has a dynamic viscosity, measured at 23° C. according to standard ISO 3219, ranging from about 5,000 to about 16,000 mPa·s, especially from about 6,000 to about 12,000 mPa·s. By way of examples of alkylated melamine resin which can be used within the context of the invention, mention may be made of those sold by Allnex under the name Cymel®.

The acrylic polyol resin preferably has a dynamic viscosity, measured at 23° C. according to standard ISO 3219, ranging from about 400 to about 1,500 mPa·s, especially from about 500 to about 1,000 mPa·s. By way of examples of acrylic polyol resin which can be used within the context of the invention, mention may be made of those sold by Bayer under the name Bayhydrol® A145.

The mixture of alkylated melamine resin and of acrylic polyol resin advantageously has a viscosity, measured at 23° C. with a Brookfield viscometer, ranging from about 50 to about 500 mPa·s. If necessary, this viscosity is adjusted by dilution.

Typically, once the sheet (2,4) has been impregnated with the mixture of alkylated melamine resin and of acrylic polyol resin, the amount of alkylated melamine resin deposited is of the order of about 12 to about 45 $g/m^2$ liquid, and the amount of acrylic polyol resin deposited is of the order of about 25 to about 75 $g/m^2$ liquid. The sheet (2,4) has a grammage of about 200 to about 450 $g/m^2$.

The mixture of alkylated melamine resin and of acrylic polyol may contain up to 5% by weight, relative to the total weight of the mixture, of one or more additives chosen from UV stabilizers, antioxidants and surfactants.

Among the UV stabilizers which can be used within the context of the invention, mention may be made of:
- UV absorbers, which are organic substances based on hydroxybenzophenone or benzotriazole,
- Quenchers, which are organic compounds (based on nickel complexes) capable of deactivating the excited states created by ultraviolet radiation,
- Radical inhibitors such as HALS (Hindered Amine Light Stabilizer) amines or S-triazine derivatives,
- Absorbent pigments, which are highly reflective in the ultraviolet range, such as titanium dioxide.

Among the antioxidants which can be used within the context of the invention, mention may be made of:
- primary antioxidants (phenolic compounds) which act on the steps of radical scission,
- secondary antioxidants (compounds based on phosphites) which decompose hydroperoxides.

Among the surfactants which can be used within the context of the invention, mention may be made of:
- modified polysiloxanes, which decrease surface tension and give better smoothing (tensioning) of the surface of the film while avoiding the formation of craters or cracks and the appearance of "orange peel" phenomena,
- siloxane-containing polyacrylates, which increase the wetting of the substrate during the application of one layer to the other,
- acrylic copolymers, which are degassing/debubbling agents.

Advantageously, the mixture of alkylated melamine resin and of acrylic polyol resin contains one or more UV stabilizers in a maximum amount of 5% by weight relative to the total weight of the mixture.

In one embodiment of the invention, the core (1) is coated on one face thereof with a sheet (2).

In another embodiment of the invention, the core (1) is coated on each of the faces thereof with a sheet (2).

In another embodiment of the invention, the core (1) is coated on at least one of the faces thereof with a sheet (3) impregnated with melamine resin, and this sheet (3) is in turn coated with a sheet (2). In a variant of the invention, the sheet (2) is a decorative sheet, and the sheet (3) is not a decorative sheet. The decoration of the sheet (2) may be plain, colored, or correspond to a pattern or drawing. Any type of decorative layer commonly used in the field of the invention may be employed. For example, it is possible to use a plain paper or a paper bearing a transferred decoration. Advantageously, the sheet (2) is pre-impregnated with melamine resin before being impregnated with the mixture of alkylated melamine resin and of acrylic polyol resin.

In another embodiment of the invention, the core (1) is coated on at least one of the faces thereof with a sheet (3) impregnated with melamine resin, and this sheet (3) is in turn coated with a sheet (4). In a variant of the invention, the sheet (4) is a protective sheet, and the sheet (3) is a decorative sheet as defined above. The protective sheet (4) is advantageously a low-grammage paper, referred to as "overlay". Such a paper forms a transparent layer and makes it possible to obtain a very good reflection of the imprint of the decoration present on the decorative sheet (3).

In the two latter embodiments, the amount of melamine resin deposited on the sheet (3) is of the order of about 60 to 100 $g/m^2$. Among the melamine resins which can be used to pre-impregnate the sheet (2) and impregnate the sheet (3), mention may be made of hydroxylated resins.

Regardless of the embodiment of the invention, the core (1) advantageously represents at least 90%, preferably at least 95% by weight of the total weight of the decorative laminate.

The decorative laminates in accordance with the invention may be prepared by lamination under high pressure. The preparation process thereof is generally carried out in four steps:
- impregnation,
- stacking,
- lamination,
- finishing.

Impregnation consists in introducing the appropriate resin into the different layers before being impregnated, namely the core (1), where appropriate the sheet (3), and the sheet (2) or (4).

The impregnating machine consists of a head, referred to as unwind stand, making it possible to unwind the spools of paper. The impregnation machine also includes an impregnation head which comprises a vessel for accommodating the resin and a system making it possible to quantify the amount of resin that it is desired to introduce to the paper per $m^2$. The impregnation machine also includes a dryer which eliminates the amount of solvent provided by the resin and a system which puts the impregnated support in the form of sheets or spools.

The impregnated sheets are advantageously dried at a temperature of about 110° C. to about 150° C. for a drying time ranging from about 2 min to about 8 min.

Stacking consists in superposing the different elements which constitute the laminate: the core (1), optionally the sheet(s) (3), and the sheet(s) (2,4).

Lamination makes it possible to assemble the different elements and is performed by thermocompression, most commonly in a press. Lamination is advantageously carried out at a temperature of about 130° C. to about 160° C. The pressure applied is preferably from about 20 to about 80 bar ($2\times10^3$ to $8\times10^3$ MPa).

A finishing step consisting of a cutting operation for cutting off the edges of the laminate obtained is most commonly carried out in order to bring the decorative laminate to the finished format.

The resistance to photochemical aging of the laminates in accordance with the invention was evaluated by means of the following methods:

SEPAP: equivalent to 1.5 solar UV in irradiation. An analysis of the samples is carried out after 165-300-443-650-800-1050-1200-1600 h with periodic soaking in water at 60° C. for 2 h, which makes it possible to study the hydrolysis of the oxidation products. This analysis is coupled with an FTIR-PAS analysis in order to identify the hydrolyzed chemical functions.

WOM: equivalent to 1 solar UV in irradiation. The temperature of the black panels is 65° C. (according to ISO 4892-2), the cycle is fixed at 102 min irradiation/18 min spraying under irradiation. As above, this analysis is coupled with an FTIR-PAS analysis.

FTIR analysis (Fourier Transformed InfraRed Spectroscopy). It is based on the absorption of infrared radiation by the material analyzed. It makes it possible, via the characteristic vibrations of chemical bonds, to analyze the chemical functions oxidized during SEPAP and WOM exposure. The rate of oxidation is measured from the accumulated of the carbonyl-based oxidation products which develop IR absorption at 1705 $cm^{-1}$. For opaque samples, photoacoustic spectroscopic analysis (FTIR-PAS) is used.

The decorative laminates in accordance with the invention have the following advantages:
    Resistance to aging in accordance with standard EN438-6 in terms of resistance to aging;
    Retention of properties of resistance to surface damage during the installation of the products (scratching) and the usage life thereof (cleaning);
    Retention of the decorative function of the laminate with use of a wide choice of decorations and surface structures;
    Simplicity of production with the high-pressure process as defined for the production of the decorative laminates;
    Competitiveness in terms of cost of the finished product; and
    Use of the system in aqueous medium, for good health and safety conditions.

The invention is illustrated by the following example given by way of indication.

EXAMPLE

A sheet of 80 g/m² decorative paper is used, intended to constitute the decorative surface of the decorative laminate. This sheet of paper is pre-impregnated with melamine resin of hydroxylated type, at a loading amount of 44-46% by weight of the total dry weight of the impregnated sheet, with 5.5-6.5% of volatiles.

This sheet is then impregnated by means of a Mayer bar with a mixture of polyol resin (sold by Bayer under the name Bayhydrol® A 145—viscosity of 950 mPa·s measured at 23° C. according to standard ISO 3219) and of alkylated melamine resin (sold by Allnex under the name Cymel® 327 Resin—viscosity of 9900 mPa·s measured at 23° C. according to standard ISO 3219), in an amount of 100 to 200 g/m² liquid. This mixture of polyol resin and of alkylated melamine resin is characterized by a viscosity after dilution, measured at 23° C. with a Brookfield viscometer, of 500+/−100 mPa·s, a weight ratio of 3, a solids extract of 45%, and contains 3% by weight of UV absorber.

This sheet is finally dried at a temperature of 130° C. for 8 minutes.

Figure 1B:
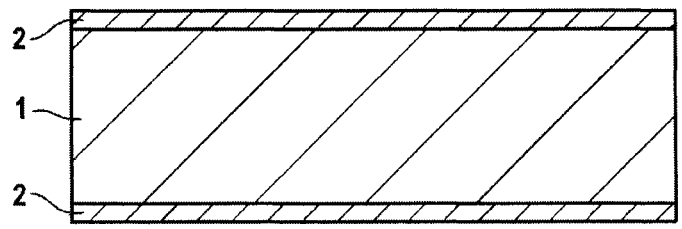
FIG. 1B represents a laminate 100 according to the invention, comprising a core 1 coated on each of the faces thereof with a sheet 2 impregnated with a mixture of alkylated melamine resin and of acrylic polyol resin.
Figure 2:
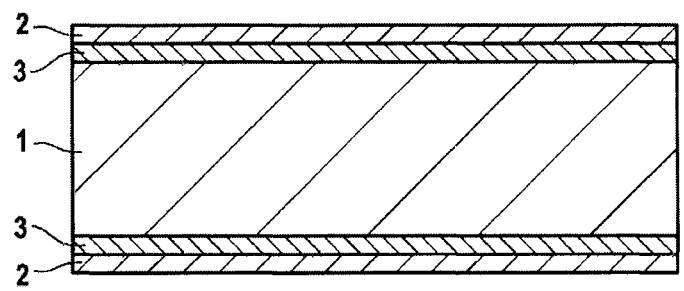
FIG. 2 represents a laminate 20 according to the invention, comprising a core 1 coated on each of the faces thereof with a sheet 3 impregnated with melamine resin, each sheet 3 in turn being coated with a sheet 2 impregnated with a mixture of alkylated melamine resin and of acrylic polyol resin.
Figure 3:
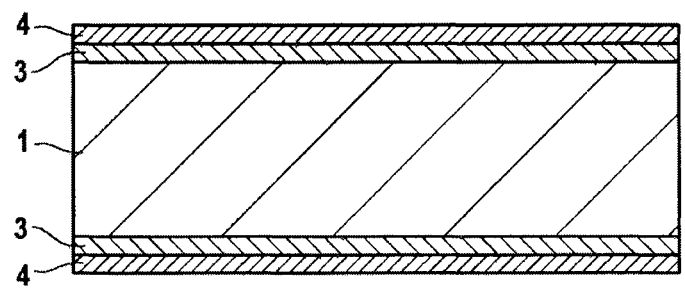
FIG. 3 represents a laminate 30 according to the invention, comprising a core 1 coated on each of the faces thereof with a sheet 3 impregnated with melamine resin, each sheet 3 in turn being coated with a protective sheet 4 impregnated with a mixture of alkylated melamine resin and of acrylic polyol resin.

The decorative laminate is then produced manually by stacking the above sheets according to the desired format and in the above order, as illustrated in FIG. 1:
    a surface coating 2, corresponding to the decorative sheet impregnated with a mixture of hydroxylated melamine resin (of aminoplast type) and with a mixture of alkylated melamine resin and polyol, on either side of a core 1,
    a core 1, corresponding to kraft sheets impregnated with phenolic resin of resol type.

Lamination is then carried out by thermal conduction obtained by means of perforated metal plates, to allow the passage of a superheated water coil, these two plates acting as a press. The cycle for curing the laminate is then carried out by a rise in temperature to 140° C. over 15 min, up to a temperature of 140 to 150° C., for 15 min, then cooling of the laminate. This thermal cycle is carried out under 20 bar pressure. The following step is finishing, which consists in eliminating the flashes on each side of the laminate. This is performed by means of a saw, knife or router.

The properties of the decorative laminate obtained are as follows:
    Consistent appearance (visual inspection).
    Resistance to photochemical aging assessed according to 2 test methods:
        1/WOM: equivalent to 1 solar UV in irradiation; black panel temperature 65° C. Measurement according to ISO 4892-2; cycle 102 min irradiation/18 min spraying under irradiation. Delta E colorimetry measurement after 4500 h of exposure=2.5, which corresponds to an assessment >=3 on the gray scale.
        2/SEPAP: equivalent to 1.5 solar UV in irradiation, sample temperature 60° C. Periodic soaking of the plates in water at 60° C. for 2 hours in order to hydrolyze the oxidation products.
        Delta E colorimetry measurement after 3000 h of exposure=1, which corresponds to an assessment >=3 on the gray scale.
    Resistance to solvent-type cleaning products: resistance measured at grade 4 (slight change, only visible at certain angles) according to the acetone test described in standard EN438-2-26.
    Scratch resistance: measured at 2 N according to standard EN438-2-25.

The invention claimed is:

1. A decorative laminate formed under heat and pressure, the decorative laminate comprising:
    a core impregnated with a phenolic resin, and
    a sheet comprised of a plain paper or a paper bearing a transferred decoration, the sheet being impregnated with a mixture comprising an alkylated melamine resin and an acrylic polyol resin in the absence of isocyantes wherein the alkylated melamine resin is crosslinked by way of the acrylic polyol, the sheet impregnated with the mixture comprising the alkylated melamine resin and the acrylic polyol resin being positioned adjacent at least one face of the core.

2. The decorative laminate as claimed in claim 1, in which the weight ratio between the alkylated melamine resin and the acrylic polyol resin in the mixture is from about 1 to about 5.

3. The decorative laminate as claimed in claim 1, in which the mixture of alkylated melamine resin and acrylic polyol resin has a viscosity, measured at 23° C. according to standard ISO 3219, ranging from about 50 to about 500 mPa·s.

4. The decorative laminate as claimed in claim 1, in which the mixture also comprises up to about 5% by weight, relative to the total weight of the mixture, of one or more additives chosen from LTV stabilizers, antioxidants and surfactants.

5. The decorative laminate as claimed in claim 1, in which the sheet has a grammage of about 200 to about 450 g/m².

6. The decorative laminate as claimed in claim 1, in which the core represents at least 90% by weight of the total weight of the laminate.

7. The decorative laminate as claimed in claim 1, in which the core is coated on one face thereof with the sheet.

8. The decorative laminate as claimed in claim 1, in which the core is coated on each of the faces thereof with the sheet.

9. The decorative laminate as claimed in claim 1, in which a sheet impregnated with melamine resin is positioned on the at least one face of the core, the sheet impregnated with melamine resin in turn being positioned on the sheet impregnated with a mixture comprising an alkylated melamine resin and an acrylic polyol resin.

10. The decorative laminate as claimed in claim 1, in which the sheet impregnated with a mixture comprising an alkylated melamine resin and an acrylic polyol resin is a decorative paper.

11. The decorative laminate as claimed in claim 1, in which the sheet impregnated with a mixture comprising an alkylated melamine resin and an acrylic polyol resin is a transparent paper.

12. The decorative laminate as claimed in claim 1, in which the core is not impregnated with a resin other than the phenolic resin.

13. The decorative laminate as claimed in claim 1, in which the mixture impregnating the sheet does not contain resins other than the alkylated melamine resin and the acrylic polyol resin.

* * * * *